United States Patent [19]

Chiang Wen

[11] Patent Number: 5,126,926
[45] Date of Patent: Jun. 30, 1992

[54] BRAKE-LIGHT/HAZARD-WARNING BOARD STRUCTURE

[76] Inventor: Chiang Chiang Wen, 2nd Fl., No. 373-5, Huacheng Rd., Hsinchuang City, Taiwan

[21] Appl. No.: 767,144

[22] Filed: Sep. 27, 1991

[51] Int. Cl.⁵ .............................................. B60Q 1/44
[52] U.S. Cl. .................................... 362/83.3; 362/61; 362/80; 362/80.1; 340/472; 340/479
[58] Field of Search ................ 362/61, 80, 80.1, 83.3, 362/74, 78; 340/471, 472, 473, 475, 479

[56] References Cited

U.S. PATENT DOCUMENTS

| | | | |
|---|---|---|---|
| 3,783,267 | 1/1974 | Thomas | 362/80 |
| 4,180,010 | 12/1979 | McDermott et al. | 362/80 |
| 4,808,968 | 2/1989 | Caine | 362/61 |
| 4,809,138 | 2/1989 | Stovall | 362/61 |
| 4,825,191 | 4/1989 | Ching-Huei | 340/479 |
| 4,835,515 | 5/1989 | McDermott et al. | 340/472 |
| 5,016,145 | 5/1991 | Singleton | 362/80.1 |
| 5,041,813 | 8/1991 | Chang | 340/472 |

*Primary Examiner*—Ira S. Lazarus
*Assistant Examiner*—Sue Hagarman
*Attorney, Agent, or Firm*—Bell, Seltzer, Park & Gibson

[57] ABSTRACT

A brake-light/hazard-warning board structure includes a first bar, a second bar, a third bar each having a pivot member at distal ends thereof, and three connecting units for connecting pivot member of said first, second, and third bars and providing a pivotal relationship therebetween. A slot is formed in one of the pivot member and the connnecting unit for receiving a suction cup by which said brake-light/hazard-warning board structure is releasably mounted to a vehicle when used as a brake light. A number of light emitting diodes are provided on the first, second, and third bars and are electrically connected in series, with two terminals electrically connected with a power source.

8 Claims, 8 Drawing Sheets

BRAKE-LIGHT/HAZARD-WARNING BOARD STRUCTURE

BACKGROUND OF THE INVENTION

The present invention relates to a brake-light/hazard-warning board structure which can be used as either a third brake light or a hazard-warning board.

In high-traffic areas, brake lights are very important to warn other drivers when a car is braking. Drivers usually adapt, in addition to the installed factory-brake lights on a back end of a vehicle, an additional brake light for alarming following drivers. In other cases, drivers use an additional triangular hazard-warning board placed behind the vehicle when stopped at the side of the road. However, the hazard-warning board occupies a certain amount of trunk space.

To obviate and/or litigate the aforementioned problems, and to improve the "third" brake light structure's function, the present invention provides an improved structure which can be used as either as a brake light or a hazard-warning board.

SUMMARY OF THE INVENTION

According to the present invention, a brake-light/hazard-warning board structure includes a first bar, a second bar, a third bar, and three connecting units for connecting the three bars and providing a pivotal relationship therebetween.

Each of the first, second, and third bars has a pivot means at distal ends thereof. Each pivot means has an arch securely mounted thereto. First and second clicks are mounted on both sides of the arch.

The connecting unit is composed of a first member and a second member. The first member has substantially circular top and bottom portions and has a semicircular teeth-like structure recessed in each top and bottom portion in a periphery thereof for engaging with corresponding clips on the pivot means. Two cylindrical protrusions, each with a first fastening hole therein, are formed in the top and bottom portions and extend outward. The second member also has substantially circular top and bottom portions and has a semi-circular teeth-like structure recessed in each top and bottom portion in a periphery thereof for engaging with corresponding clicks on the pivot means. Two second fastening holes are formed in the second member, corresponding to the first fastening holes and through which screws are passable. A first slot is formed in each connecting unit for receiving a suction cup when used as a brake light. A second slot is formed in the pivot means for receiving a suction cup when used as a hazard-warning board.

Due to the provision of the clicks and the semicircular teeth-like structure, the connecting unit and the pivot means are in pivotal connection. When the first, second, and third bars are pivoted to a desired position, for example, to form a hazard-warning board, screws can be provided to fasten the whole structure, and pivot movement thereof is not allowed.

A plurality of light emitting diodes (LED) are provided on the first, second, and third bars and are electrically connected in series via wires, with two terminals for electrically connecting in parallel with wires pre-set in the brake lights installed in a back end of a vehicle.

For providing a brake light function, the brake-light/hazard-warning board structure according to the present invention is folded with two suction cups received in the connecting units, thereby attaching the whole brake-light/hazard-warning board structure to a rear window of a vehicle. The terminals of the brake light structure are electrically connected in parallel with pre-set wires of the brake lights of the vehicle.

When the brake-light/hazard-warning board structure is constructed to form a hazard-warning board, two suction cups are now received in the first slots in the pivot means of a bottom bar thereof, thereby attaching the hazard-warning board on a trunk lid of the vehicle.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
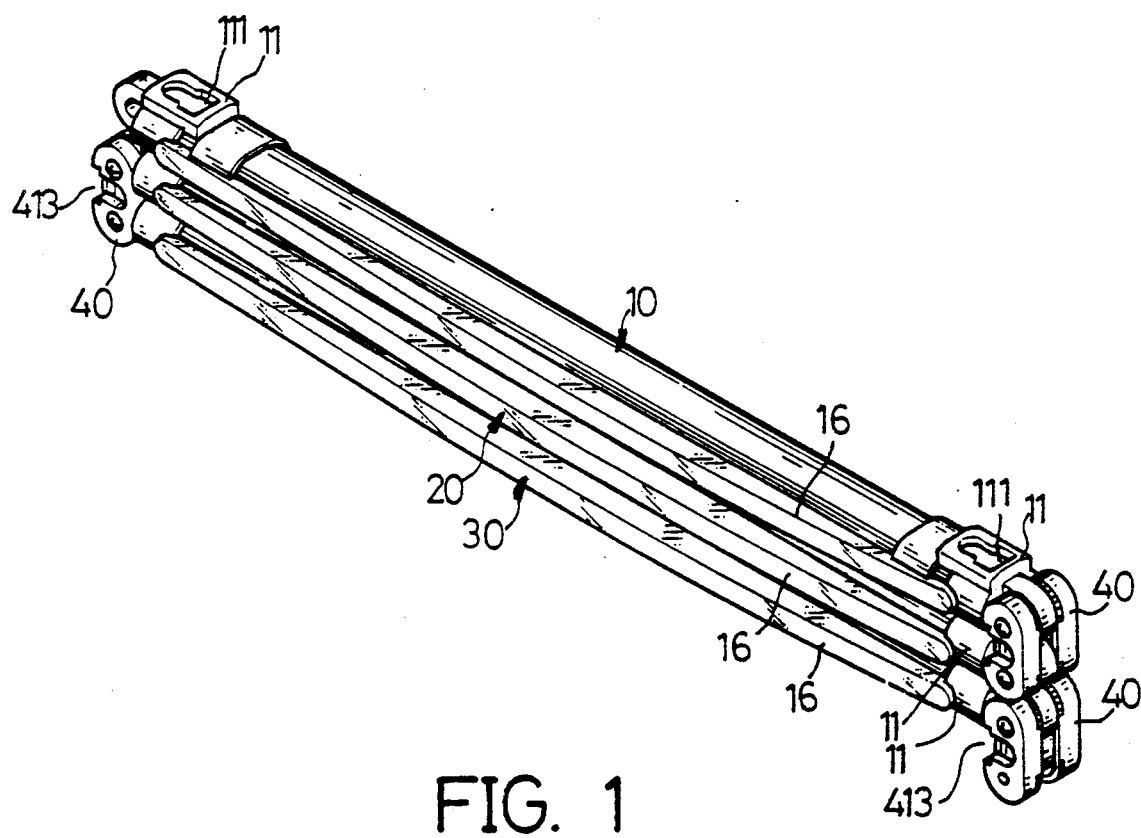
FIG. 1 is a perspective view of a brake-light/hazard-warning board structure according to the present invention.
Figure 2:
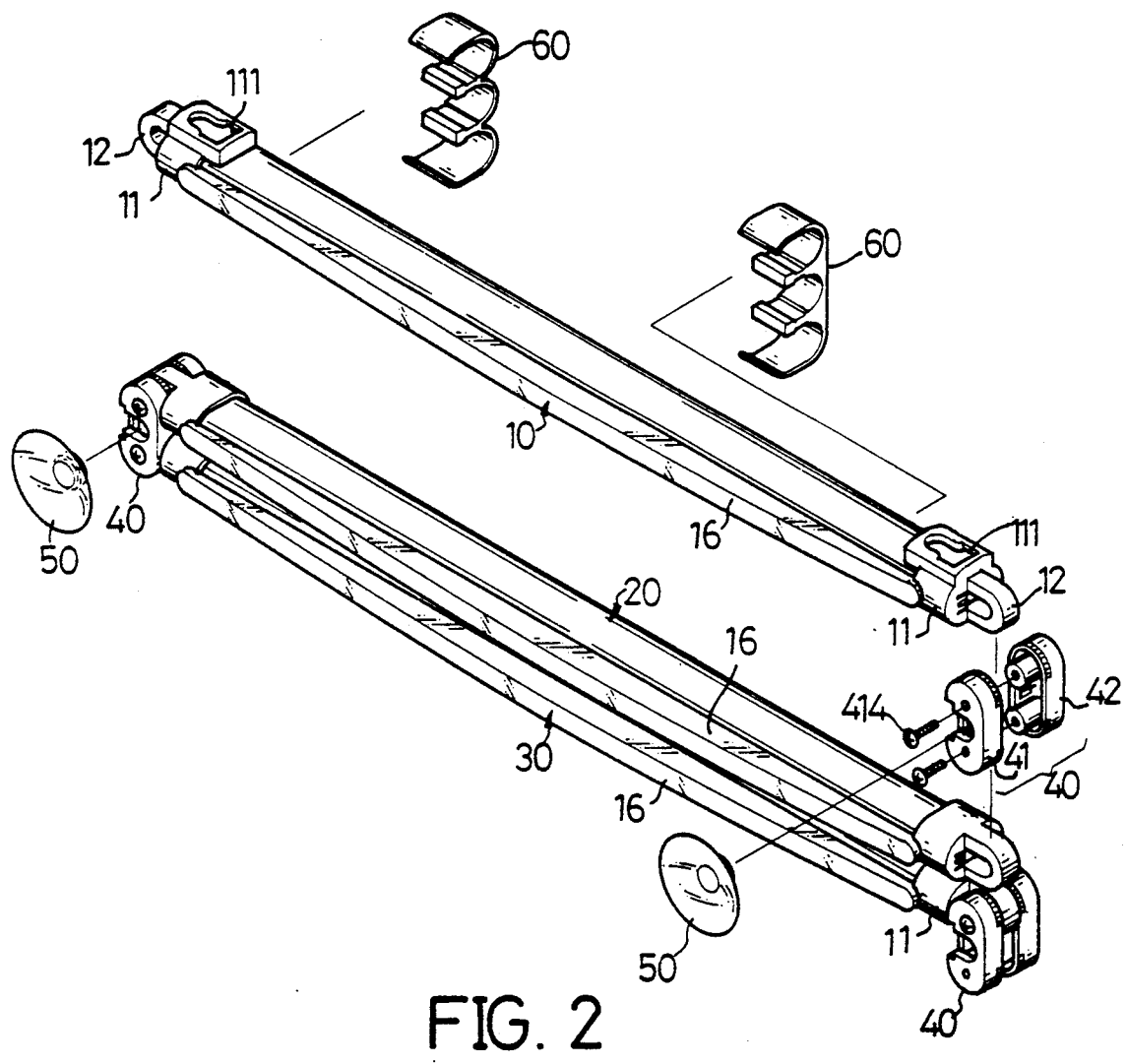
FIG. 2 is an exploded view of the brake-light/hazard-warning board structure in FIG. 1.

Referring to the drawings and initially to FIGS. 1 through 4, a brake-light/hazard-warning board structure according to the present invention includes a first bar 10, a second bar 20, a third bar 30, and three connecting units 40 for connecting the three bars 10, 20, and 30 and providing a pivotal relationship therebetween.

Each of the first, second, and third bars 10, 20, and 30 has a pivot means 11 at distal ends thereof. Each pivot means 11 has an arch 12 securely mounted thereto. First and second clicks 113 (only one is shown) are formed on both sides of the arch 12, whose function will be described later.

Figure 3:
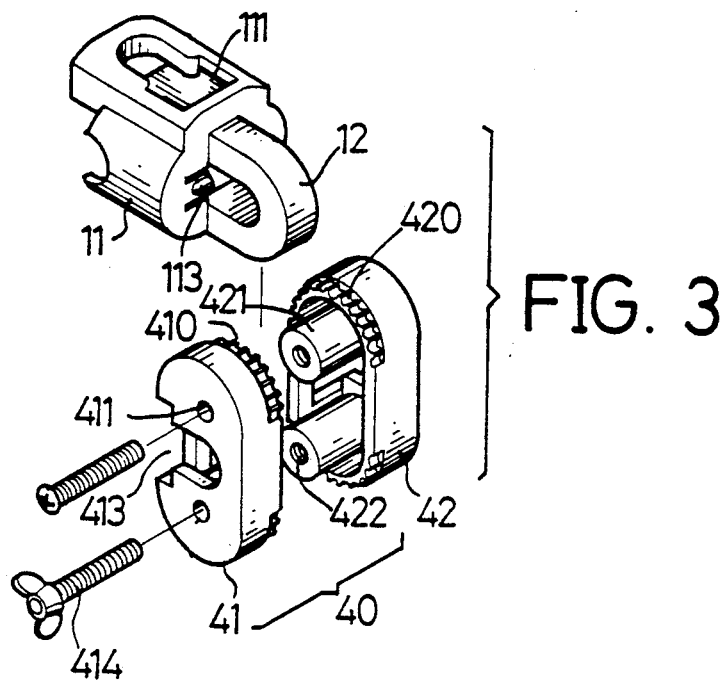
FIG. 3 is a perspective view in an enlarged scale showing the details of a pivot means and a connecting unit of the present invention.

Referring to FIG. 3, the connecting unit 40 is composed of a first member 41 and a second member 42. The first member 41 has substantially circular top and bottom portions and has a semi-circular teeth-like structure 420 recessed in each top and bottom portion in a periphery thereof for engaging with corresponding clips 113 on the pivot means 11. Two cylindrical protrusions 421, each with a first fastening hole 422 therein, are formed in the top and bottom portions and extend outward. The second member 42 also has substantially circular top and bottom portions and has a semi-circular teeth-like structure 410 recessed in each top and bottom portion in a periphery thereof for engaging with corresponding clicks 113 on the pivot means 11. Two second fastening holes 411 are formed in the second member 41, corresponding to the first fastening holes 422 in the first member 42 and through which screws 414 are passable. A first slot 413 is formed in the first and second members 41 and 42 of the connecting unit 40 for receiving a suction cup 50 when used as a brake light. A second slot 111 is formed in the pivot means 11 for receiving a suction cup 50 when used as a hazard-warning board.

Figure 4:
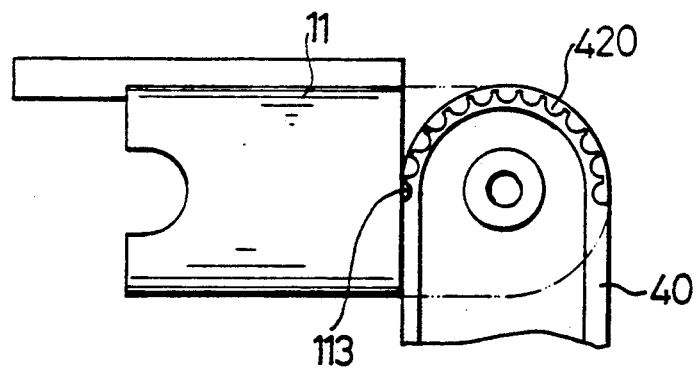
FIG. 4 is a schematic side view showing engagement of the pivot means and the connecting unit.

As can be seen in FIG. 4, due to the provision of the clicks 113 and the semi-circular teeth-like structures 410 and 420, the connecting unit 40 and the pivot means 11 are in pivotal connection. When the first, second, and third bars 10, 20, and 30 are pivoted to a desired position, for example, to form a hazard-warning board, an additional screw can be provided to fasten the whole structure, and pivot movement thereof is not allowed.

A plurality of light emitting diodes (LED) 16 are provided on the first, second, and third bars 10, 20, and 30 and are electrically connected in series via wires 15, with two terminals 13 and 14 for electrically connecting in parallel with wires (not shown) pre-set in the brake lights 2 installed in a back end of a vehicle.

For providing a brake light function, the brake-light-/hazard-warning board structure according to the present invention is folded with two suction cups received in the connecting units, thereby attaching the whole brake-light/hazard-warning board structure to a rear window of a vehicle. The terminals of the brake light structure are electrically connected in parallel with pre-set wires of the brake lights of the vehicle.

Figure 5:
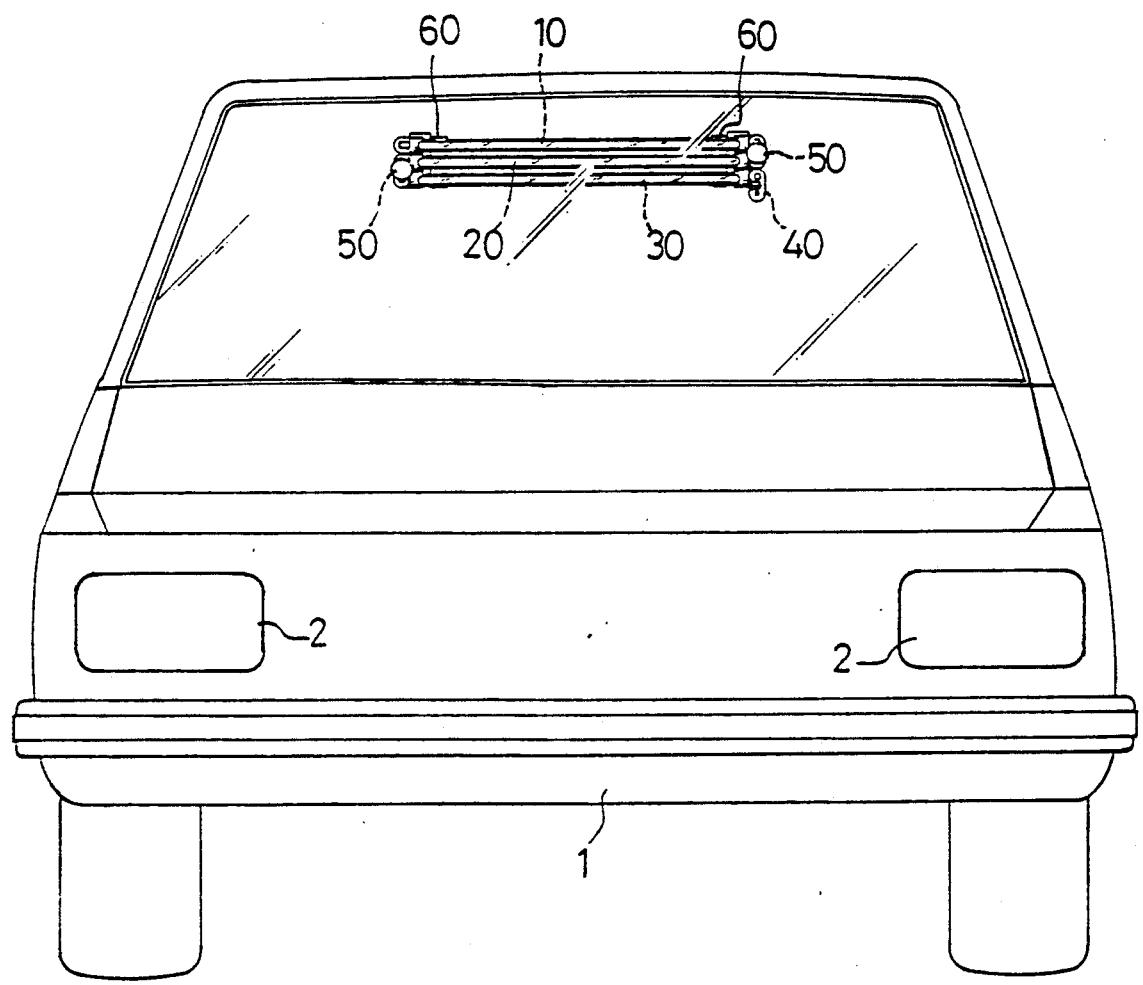
FIG. 5 is a schematic view illustrating the use of cross-sectional view of the brake-light/hazard-warning board structure.

Referring now to FIG. 5, for providing a brake light function, the brake-light/hazard-warning board structure according to the present invention is folded to a status shown in this figure. Two suction cups 50 are received in the first slots 413 in the connecting unit 40, thereby attaching the whole brake light structure to a rear window of a vehicle 1. Additionally, two retaining means 60 (see FIG. 1 for detailed structure) are provided for retaining the three bars 10, 20, and 30 in a folded status. It is known that in this embodiment the two terminals 13 and 14 of the brake-light/hazard-warning board structure are electrically connected in parallel with pre-set wires of the brake lights 2 of the vehicle. Nevertheless, the brake light structure can be lowered and the two suction cups 50 can be received in the second slots 413 in the third bar 30, thereby attaching the brake light structure to a plate behind the rear seats in the vehicle 1.

Figure 6:
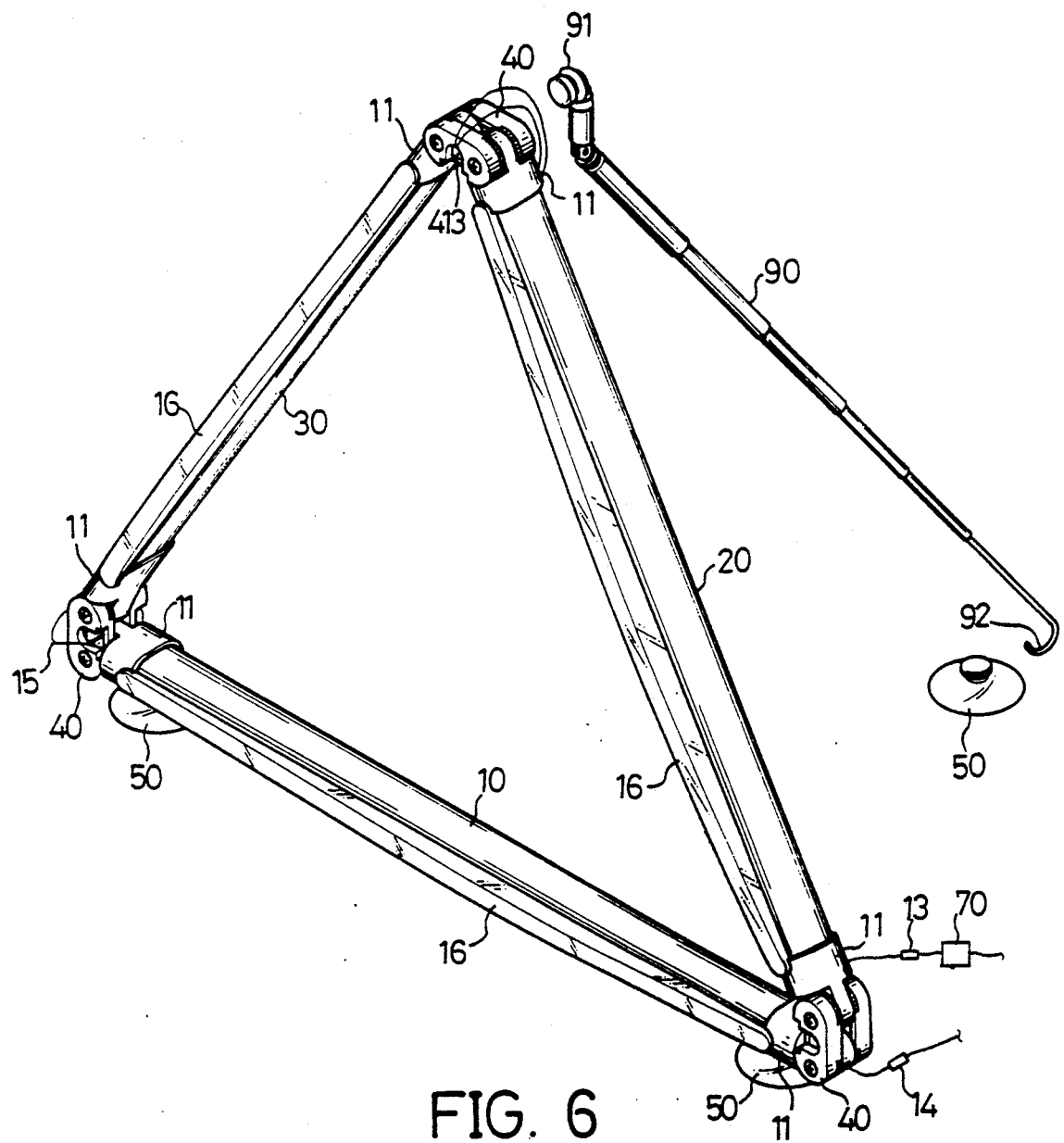
FIG. 6 is a perspective view of the brake-light/hazard-warning board structure assembled to form a hazard-warning board.
Figure 7:
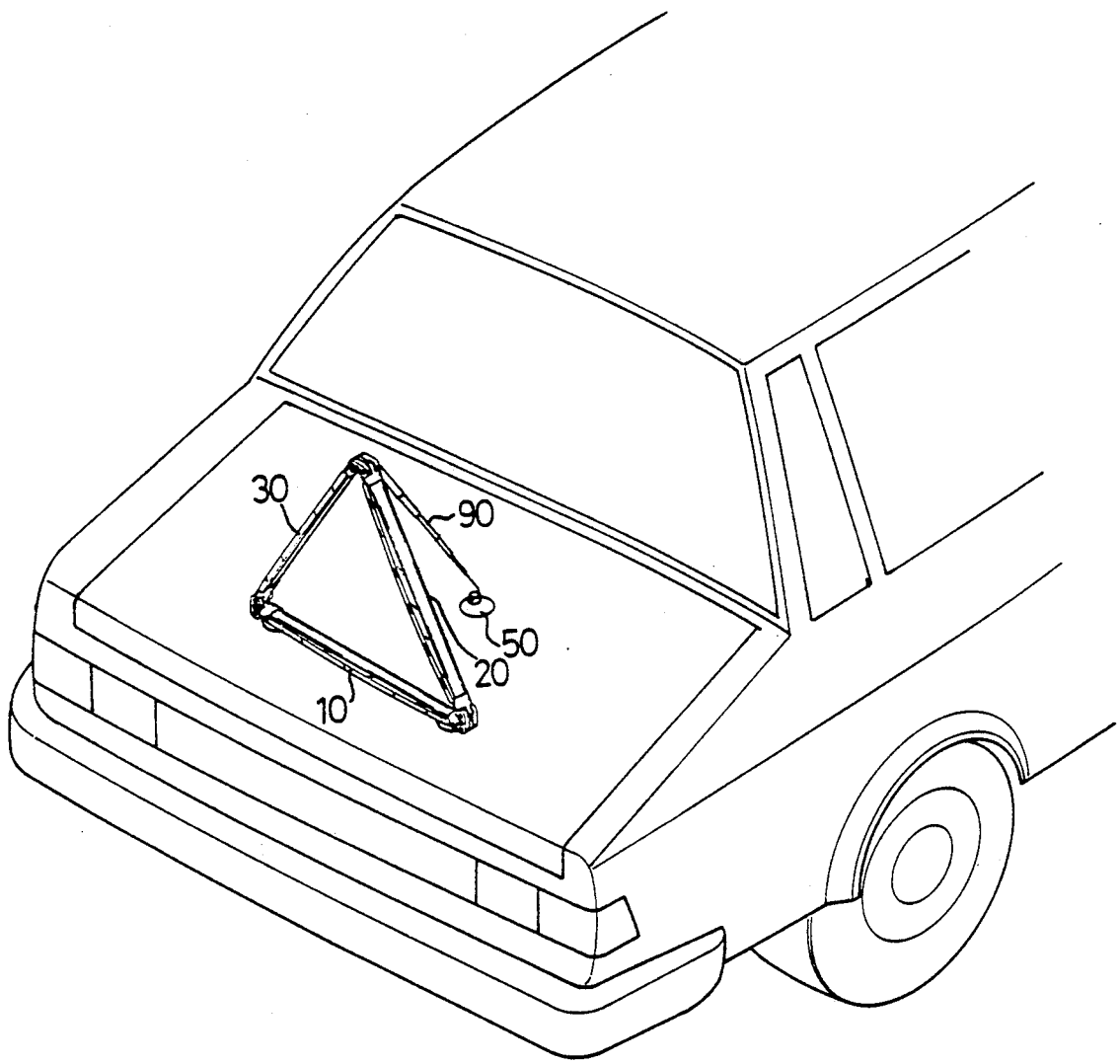
FIG. 7 is a schematic view illustrating the use of the hazard-warning board constructed by the brake-light/hazard-warning board structure.

Referring to FIGS. 6 and 7, in which the brake-light-/hazard-warning board structure is constructed to form a hazard-warning board, two suction cups 50 are now received in the second slots 111 in the first bar 10, thereby attaching the hazard-warning board on a trunk lid of the vehicle. Additionally, a telescopic rod 90 can be applied to assist in supporting of the hazard-warning board. The telescopic rod 90 has a hooked end for engaging with a further suction cup 50 on the trunk lid and an engaging block 91 at the other end for engaging with the first slot 413 on the uppermost connecting unit 40. It is known that in this embodiment the two terminals 13 and 14 of the hazard-warning board constructed by the brake-light/hazard-warning board structure are electrically connected with a power source, such as a cigarette lighter in the vehicle 1. A blinking means 70 can be provided in this embodiment so that the LEDs 16 provide a blinking effect. The wires are omitted here for clarity.

Figure 8:
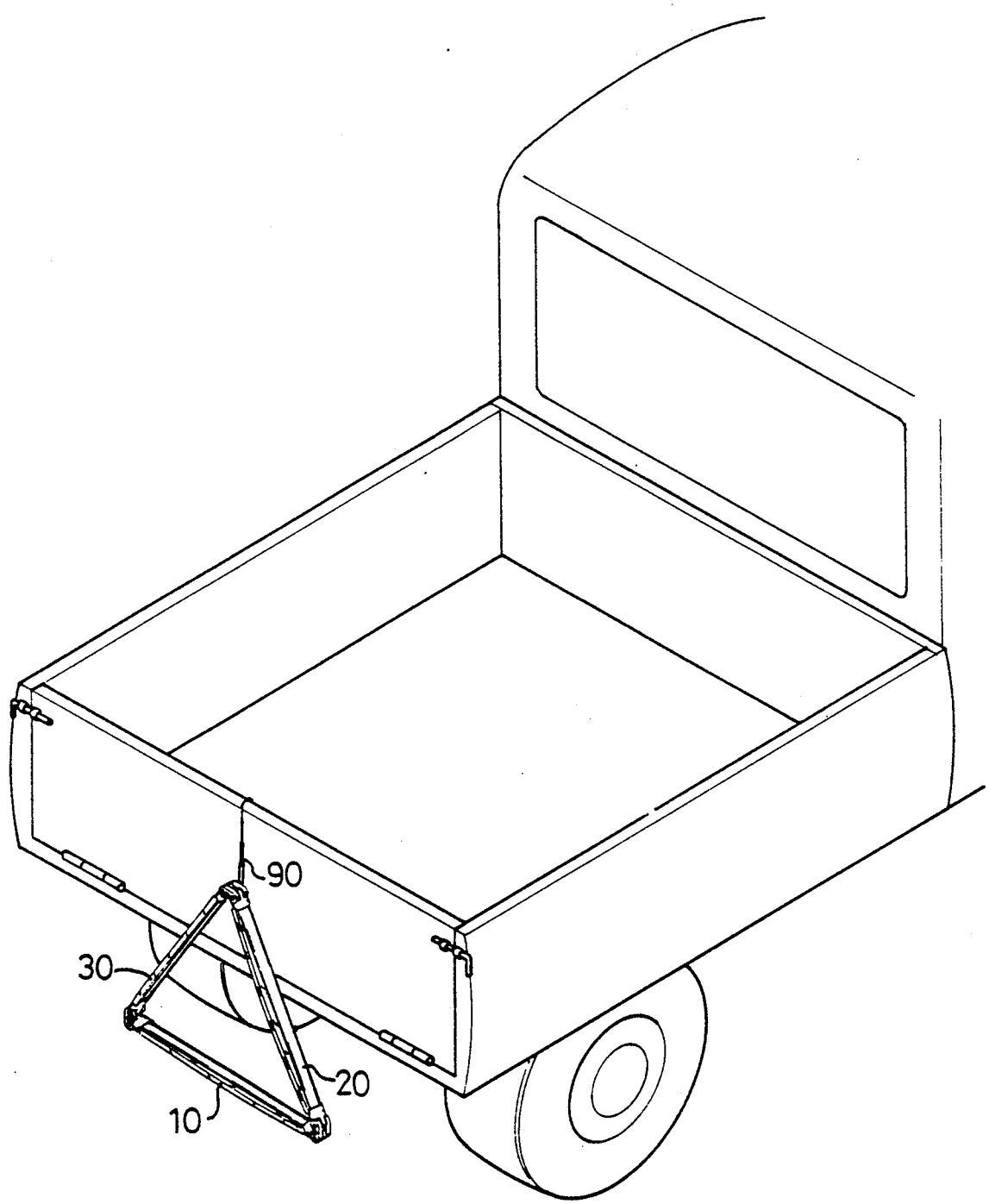
FIG. 8 is another perspective view illustrating another use of the hazard-warning board.

FIG. 8 shows another embodiment of the present invention, in which the hazard-warning board constructed by the brake-light/hazard-warning board structure is hung on a tailgate of a truck by the hooked end 91. Again, in this embodiment the two terminals 13 and 14 of the hazard-warning board are electrically connected with a power source, such as the cigarette lighter in the vehicle 1. A blinking means 70 can be provided in this embodiment so that the LEDs 16 provide a blinking effect. The wires are omitted here for clarity.

Figure 9:
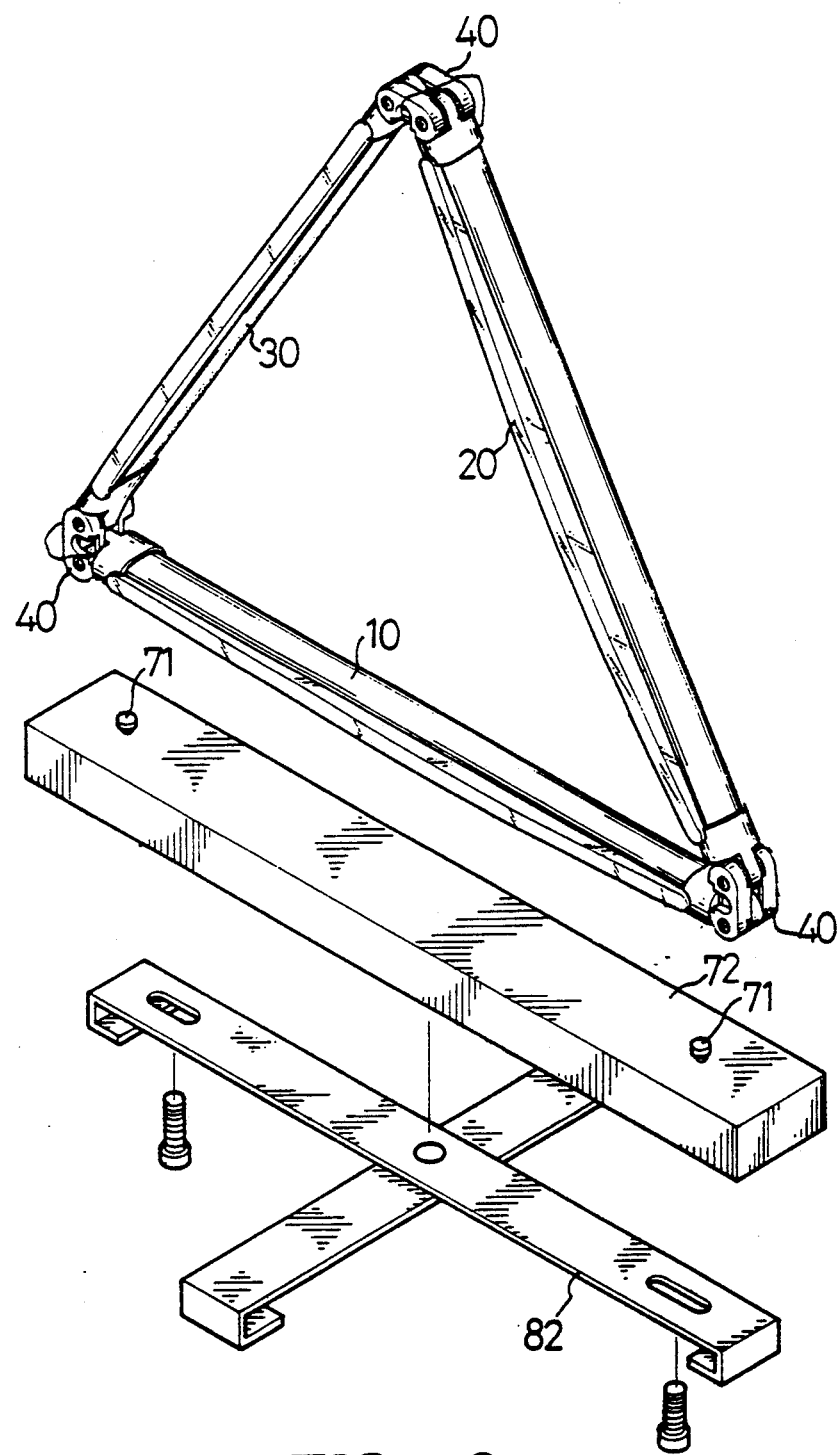
FIG. 9 is a perspective view illustrating a further use of the hazard-warning board.

FIG. 9 shows a further embodiment of the hazard-warning board, in which the hazard-warning board is securely mounted on a battery box 72, which in turn is mounted on a cross-support 82 via screws. The battery box has two knots 71 on an upper side thereof to be received in the second slots 111 of the bottom bar 10 of the hazard-warning board, thereby retaining the hazard-warning board on the battery box 72, which is a power source for the LEDs of the hazard-warning board. Again, a blinking means can be provided in this embodiment so that the LEDs 16 provide a blinking effect.

Although the invention has been explained in relation to its preferred embodiment, it is to be understood that many other possible modifications and variations can be made without departing the spirit and scope of the invention as hereinafter claimed.

I claim:

1. A brake-light/hazard-warning board structure comprising a first bar, a second bar, a third bar each having a pivot means at distal ends thereof, and three connecting units for connecting pivot means of said first, second, and third bars and providing a pivotal relationship therebetween, a slot being formed in at least one of said pivot means and said connecting units for receiving a mounting means by which said brake-light/hazard-warning board structure is releasably mounted to a vehicle when used as a brake light, a plurality of light-emitting diodes being provided on said first, second, and third bars and being electrically connected in series, with two terminals electrically connected with a power source.

2. The brake-light/hazard-warning board structure as claimed in claim 1, wherein said mounting means is a suction cup.

3. The brake-light/hazard-warning board structure as claimed in claim 1, wherein said terminals are electrically connected in parallel with wires pre-set in brake lights installed in a back end of a vehicle.

4. The brake-light/hazard-warning board structure as claimed in claim 1, wherein each pivot means has an arch securely mounted thereto, first and second clicks are formed on both sides of each said arch, each said connecting unit comprises a first member, a second member, and a means for releasably fastening said first and second members, said first member has first substantially circular top and bottom portions and has a first semi-circular teeth-like structure recessed in each said first circular top and bottom portion in aperiphery thereof for engaging with corresponding clicks on said pivot means, said second member has second substantially circular top and bottom portions and has a second semi-circular teeth-like structure recessed in each said second circular top and bottom portion in a periphery thereof for engaging with corresponding clicks on said pivot means.

5. The brake-light/hazard-warning board structure as claimed in claim 1, further comprising a retaining means for retaining said first, second, and third bars in a folded status when used as a brake light structure.

6. The brake-light/hazard-warning board structure as claimed in claim 2, wherein two said suction cups are received in said slots in a bottom bar of said brake-light-/hazard-warning board structure when constructed to form a hazard-warning board, thereby attaching said hazard-warning board on a trunk lid of the vehicle.

7. The brake-light/hazard-warning board structure as claimed in claim 6, further comprising a telescopic rod for assisting in supporting of a hazard-warning board constructed by said brake-light/hazard-warning board structure, said telescopic rod having a first hooked end and a second end with an engaging block.

8. The brake-light/hazard-warning board structure as claimed in claim 6, wherein said first hooked end engages with a suction cup on a trunk lid of said vehicle, and said engaging block is received in said second slot of said hazard-warning board.

* * * * *